(12) United States Patent
Li et al.

(10) Patent No.: US 12,413,845 B1
(45) Date of Patent: Sep. 9, 2025

(54) INSPECTION DEVICE WITH DISPLAY SCREEN

(71) Applicant: Zhengzhong Li, Shaoyang (CN)

(72) Inventors: Zhengzhong Li, Shaoyang (CN); Wenming Li, Shaoyang (CN)

(73) Assignee: Zhengzhong Li, Shaoyang (CN)

( * ) Notice: Subject to any disclaimer, the term of this patent is extended or adjusted under 35 U.S.C. 154(b) by 0 days.

(21) Appl. No.: 19/005,262

(22) Filed: Dec. 30, 2024

Related U.S. Application Data

(63) Continuation-in-part of application No. 18/812,322, filed on Aug. 22, 2024, now Pat. No. 12,256,904.

(51) Int. Cl.
| | |
|---|---|
| *A61B 1/227* | (2006.01) |
| *H04N 23/56* | (2023.01) |
| *H04N 23/63* | (2023.01) |
| *H02J 7/00* | (2006.01) |

(52) U.S. Cl.
CPC ............. *H04N 23/63* (2023.01); *H04N 23/56* (2023.01); *H02J 7/0042* (2013.01)

(58) Field of Classification Search
None
See application file for complete search history.

(56) References Cited

U.S. PATENT DOCUMENTS 5,202,817 A    4/1993   Koenck et al.

FOREIGN PATENT DOCUMENTS

| CN | 110960194 A | 4/2020 |
| CN | 212118105 U | 12/2020 |
| CN | 213216835 U | 5/2021 |
| CN | 113080860 B | 11/2022 |
| CN | 218547505 U | 2/2023 |

*Primary Examiner* — Jan Chirstopher L Merene

(57) ABSTRACT

An inspection device with a display screen relates to the technical field of personal care tools, which includes: a handle internally provided with a control circuit board; a display module assembled at one end of the handle, wherein a display screen electrically connected to the control circuit board is arranged on one side of the display module; and an image acquisition module assembled at one side of the display module far away from the display screen and electrically connected to the control circuit board; wherein the display module is configured to display an acquired image and rotatably assembled at one end of the handle, and a reverse current protection module is arranged on the control circuit board. The above technical solution facilitates an operator to directly observe a captured image from the display screen of the inspection device during operation, and improves the display stability of the captured image.

20 Claims, 14 Drawing Sheets

INSPECTION DEVICE WITH DISPLAY SCREEN

CROSS-REFERENCE TO RELATED APPLICATIONS

This application is a Continuation in Part of the U.S. application Ser. No. 18/812,322 filed on Aug. 22, 2024, and entitled "Inspection Device With Display Screen", now pending, the entire disclosures of which are incorporated herein by reference.

TECHNICAL FIELD

The present invention relates to the technical field of personal care tools, and in particular, to an inspection device with a display screen.

BACKGROUND

Currently, personal care tools with camera functions are widely used in daily production and life, such as a visual earpick and a pair of visual tweezers. Such personal care tools are not provided with a display screen and display the photographed content by a terminal device. For example, Chinese Patent Application Publication No. CN219516806U discloses a multipurpose visual earpick. Although this multipurpose visual earpick can capture the ear canal of a user, the captured image can only be viewed by a mobile terminal, which is inconvenient for the operator to use. In addition, since a device with a camera function is provided with a battery and a charging port, line damage is easily caused during the power supply switching process, resulting in loss of the captured image.

SUMMARY

In view of the defects and shortcomings in the prior art, the present invention aims to provide an inspection device with a display screen, which facilitates an operator to directly observe a captured image from the display screen of the inspection device during operation, and improves the display stability of the captured image.

To achieve the above objective, the present invention adopts the following technical solution. An inspection device with a display screen includes:
  a handle internally provided with a control circuit board and a battery;
  a display module assembled at one end of the handle, wherein a display screen electrically connected to the control circuit board is arranged at one side of the display module; and
  an image acquisition module assembled at one side of the display module far away from the display screen and electrically connected to the control circuit board; wherein
  the display module is configured to display an image acquired by the image acquisition module;
  the control circuit board includes: a power supply control module, a charging module, a power conversion module, and a reverse current protection module, wherein the power supply control module is connected to the battery, the charging module, the power conversion module, and the reverse current protection module, and the power conversion module is connected to the display screen and the image acquisition module; and the reverse current protection module includes: an MOS transistor, a diode, a first resistor, a second resistor, and a battery charging management chip, wherein a source of the MOS transistor is connected to the battery, a drain of the MOS transistor is connected to a negative electrode of the diode and the power supply control module, a gate of the MOS transistor is connected to one end of the first resistor and one end of the second resistor, the other end of the second resistor is connected to a positive electrode of the diode and the battery charging management chip, and the other end of the first resistor is grounded.

According to a further configuration of the present invention, the battery charging management chip includes: a TP4056 charging management chip, wherein a voltage positive input pin and an enabling input pin of the TP4056 charging management chip are connected, and a battery connection pin of the TP4056 charging management chip is connected to a positive electrode of the battery.

According to a further configuration of the present invention, a charging through hole is provided at the other end of the handle, the charging module includes: a Type-C female socket and an overcurrent protection chip, an input pin of the overcurrent protection chip is connected to the Type-C female socket, an output pin of the overcurrent protection chip is connected to the power supply control module, and the Type-C female socket is arranged in the charging through hole.

According to a further configuration of the present invention, the overcurrent protection chip includes: an LP5300-B6 overcurrent protection chip.

According to a further configuration of the present invention, the control circuit board further includes: a TF card reading and writing module, and the TF card reading and writing module is connected to the power conversion module and the power supply control module.

According to a further configuration of the present invention, the control circuit board further includes: a TF card slot provided on the display module, the TF card reading and writing module includes: a TF card socket, a third resistor, and a filter capacitor (C31), a working voltage pin of the TF card socket is connected to one end of the third resistor and one end of the filter capacitor, the other end of the filter capacitor is grounded, the other end of the third resistor is connected to the power supply control module, and the TF card socket is arranged in the TF card slot.

According to a further configuration of the present invention, the power conversion module includes: an HX3302C power conversion chip.

According to a further configuration of the present invention, a rotating seat is rotatably assembled at one end of the handle, the display module is fixedly assembled on the rotating seat, an arc-shaped travel hole is formed at one end of the handle, and the rotating seat includes: a rotating seat body rotatably assembled in the handle, and a fixing portion arranged on the rotating seat body, extending out of the arc-shaped travel hole and configured to fix and assemble with the display module; and the rotating seat moves in the arc-shaped travel hole to enable the display module and the handle to rotate relatively.

According to a further configuration of the present invention, a retainer is provided in the handle, an outwardly protruding rotating shaft is provided on the rotating seat body, one end of the retainer close to the arc-shaped travel hole is provided with a rotating shaft hole corresponding to the rotating shaft, and the rotating seat body is rotatably assembled at one end of the retainer close to the arc-shaped travel hole by the rotating shaft.

According to a further configuration of the present invention, a positioning structure is provided between the rotating seat and the handle, so that the rotating seat can be positioned at a set angle.

According to a further configuration of the present invention, the retainer is provided with an elastic protrusion positioned in the rotating shaft hole and protruding toward a center of the rotating shaft hole, a plurality of arc-shaped grooves corresponding to the elastic protrusions are continuously provided on an outer peripheral wall of the rotating shaft, and when the rotating seat body rotates to a set angle, the elastic protrusion is placed in one of the arc-shaped grooves.

According to a further configuration of the present invention, the retainer includes: a retainer body, and a retainer buckle cover assembled on the retainer body and configured to cooperate with the retainer body to prevent the rotating seat body from falling off, a space for the rotating seat body to be rotated and assembled is reserved between the retainer body and the retainer buckle cover, the retainer body and the retainer buckle cover jointly define the rotating shaft hole, and the elastic protrusion is mounted in the retainer buckle cover.

According to a further configuration of the present invention, the fixing portion includes a rod body extending outward from the rotating seat body and a sleeve body arranged on one side of the rod body, the display module is provided with a screw mounting post, and the sleeve body is sleeved on the screw mounting post and locked by screws.

According to a further configuration of the present invention, a rotation angle between the display module and the handle is M, and M is 0-360 degrees.

According to a further configuration of the present invention, the rotating seat is provided with a channel communicated with the handle and the display module and configured for a flexible circuit board to pass through.

According to a further configuration of the present invention, a display window is provided on the display screen, the display window is circular, the image acquisition module includes a camera, and the display screen is arranged parallel to the camera.

According to a further configuration of the present invention, the image acquisition module further includes an inspection head assembled at one side of the display module far away from the display screen, the camera is arranged in the inspection head, and one end of the inspection head far away from the display screen is configured to assemble a workpiece.

According to a further configuration of the present invention, the inspection head is strip-shaped.

According to a further configuration of the present invention, a protective cover is also provided outside the inspection head, and the protective cover is made of a flexible material.

According to a further configuration of the present invention, the image acquisition module further includes a plurality of LED lights arranged around the camera (320).

With the adoption of the above technical solution, the present invention has the following beneficial effects. In the present invention, the display module with the display screen is provided at one end of the handle, and the image acquisition module is arranged at the other side of the display screen, so that an operator can directly observe an image acquired by the image acquisition module by the display screen during operation. This operation is more convenient compared with the operation of observing an image from a mobile terminal. In addition, since the image acquisition module is assembled at one side of the display module far away from the display screen, that is, an acquisition end of the image acquisition module is arranged parallel to the display screen, an image observed by an operator from the display screen is similar to an angle at which the operator directly views the observed position, and the operator can control the inspection device to operate more conveniently. Moreover, a reverse current protection module is arranged on a control circuit board, which improves the display stability of the captured image and reduces the influence of circuit burnout on the display of the captured image.

BRIEF DESCRIPTION OF DRAWINGS

To more clearly illustrate the technical solution in the embodiments of the present invention or in the prior art, the accompanying drawings required to be used in the description of the embodiments or the prior art are briefly introduced below. It is obvious that the accompanying drawings in the description below are only some embodiments of the present invention, and those of ordinary skill in the art can obtain other accompanying drawings according to these accompanying drawings without creative efforts.

Figure 1:
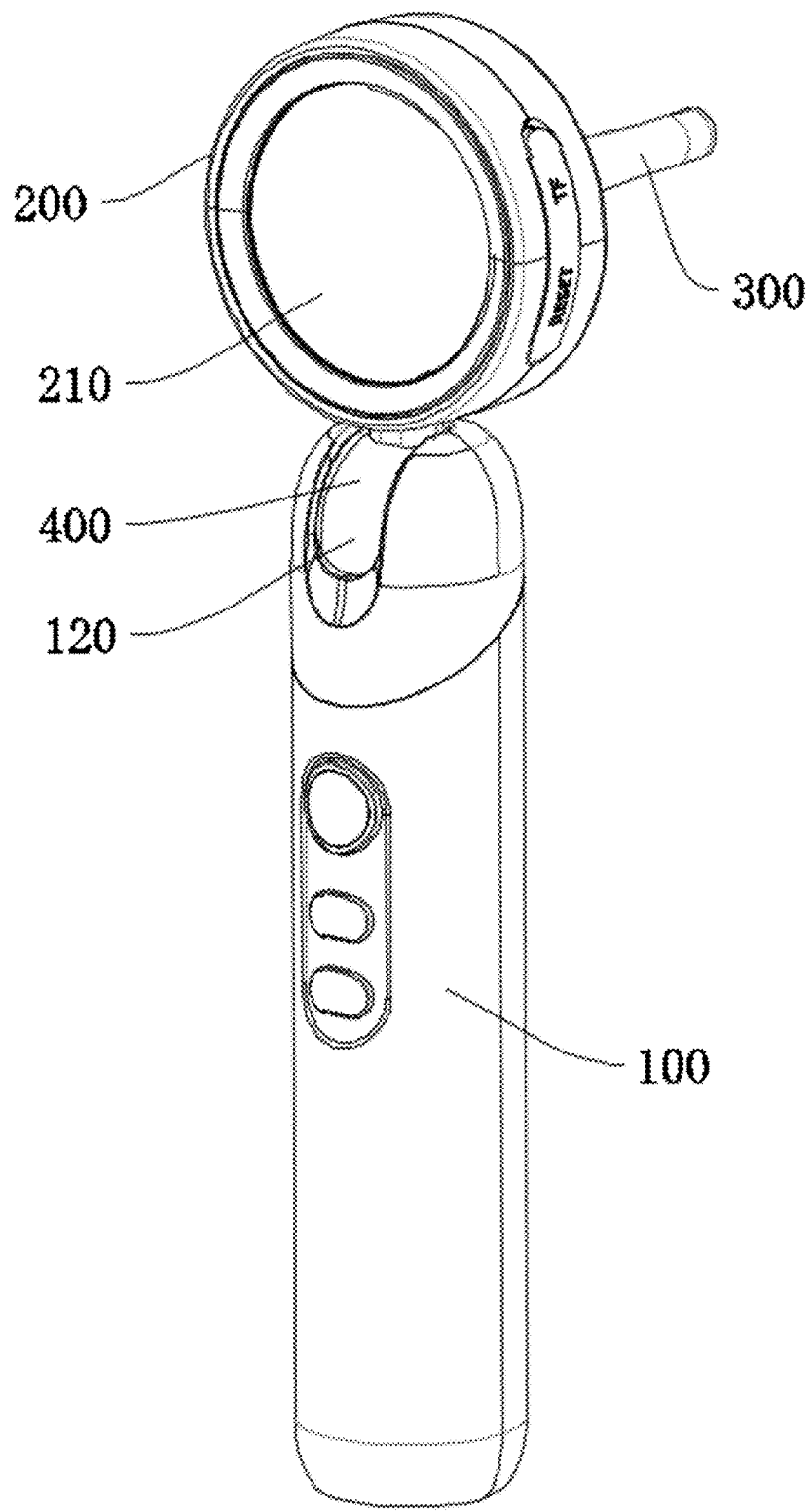
FIG. 1 is a schematic diagram of a structure of an inspection device.

Reference numerals: 100: handle; 110: control circuit board; 111: power supply control module; 112: battery; 113: charging module; 114: power conversion module; 115: reverse current protection module; 116: TF card reading and writing module; Q1: MOS transistor; D9: diode; R14: first resistor; R13: second resistor; U22: battery charging management chip; TYPE-C M: Type-C female socket; U7: overcurrent protection chip; TF1: TF card socket; R2: third resistor; C31: filter capacitor; 120: arc-shaped travel hole;

130: retainer; 130a: rotating shaft hole; 131: retainer body; 132: retainer buckle cover; 140: charging through hole;
   200: display module; 210: display screen; 220: screw mounting post; 230: TF card slot;
   300: image acquisition module; 310: inspection head; 320: camera; 330: protective cover; 340: LED light;
   400: rotating seat; 400a: channel; 410: rotating seat body; 411: rotating shaft; 412: arc-shaped groove; 420: fixing portion; 421: rod body; 422: sleeve body;
   500: flexible circuit board; and
   600: elastic protrusion.

DETAILED DESCRIPTION OF EMBODIMENTS

The present invention is further described in detail below in conjunction with the accompanying drawings.

This specific embodiment is merely an explanation of the present invention, but not a limitation of the present invention. After reading this specification, those skilled in the art can make non-creative modifications to this embodiment based on a requirement, and these modifications are all protected by the Patent Law as long as they are within the scope of the claims of the present invention.

Figure 2A:
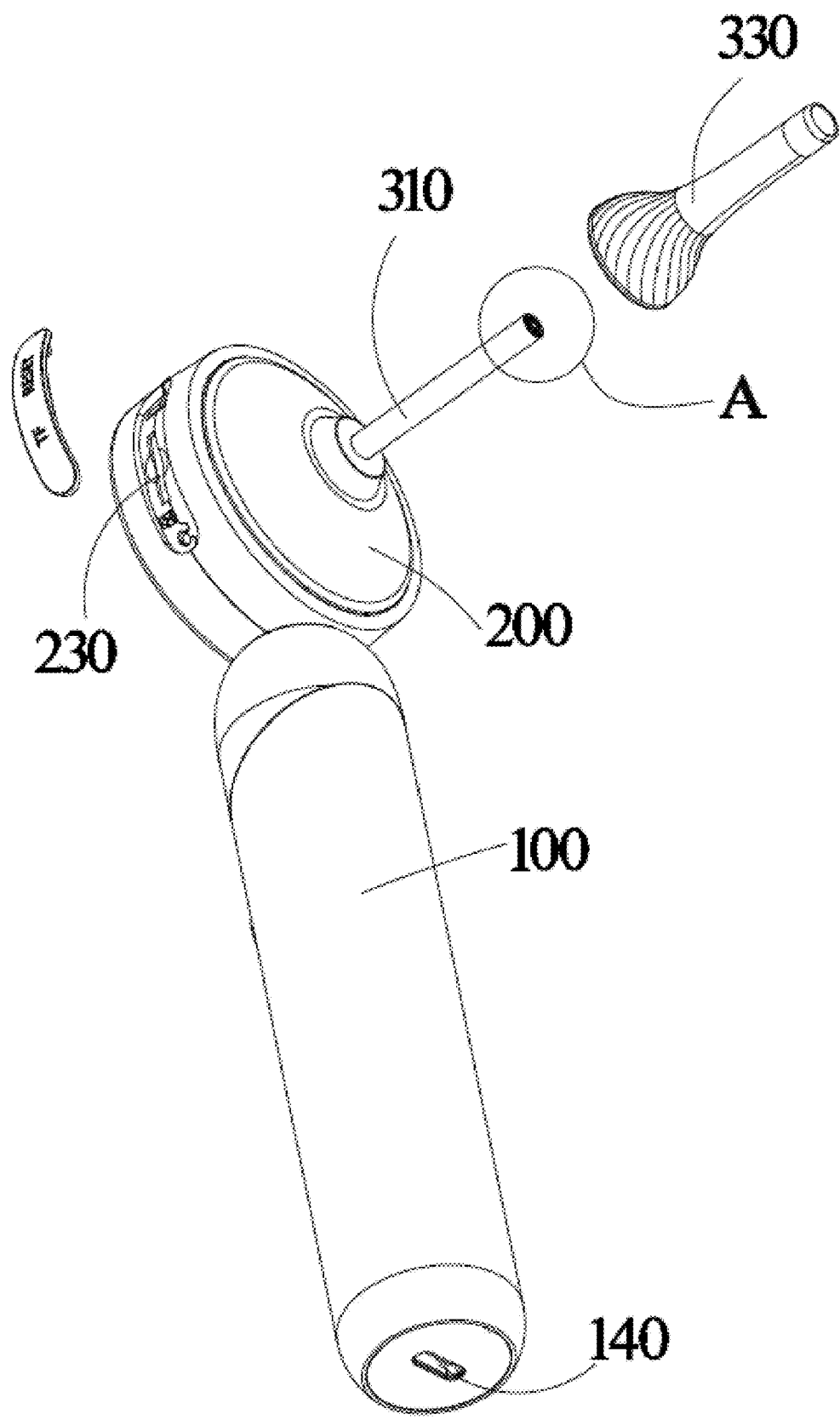
FIG. 2A is an exploded schematic diagram of a structure of an inspection device from another perspective.
Figure 2B:
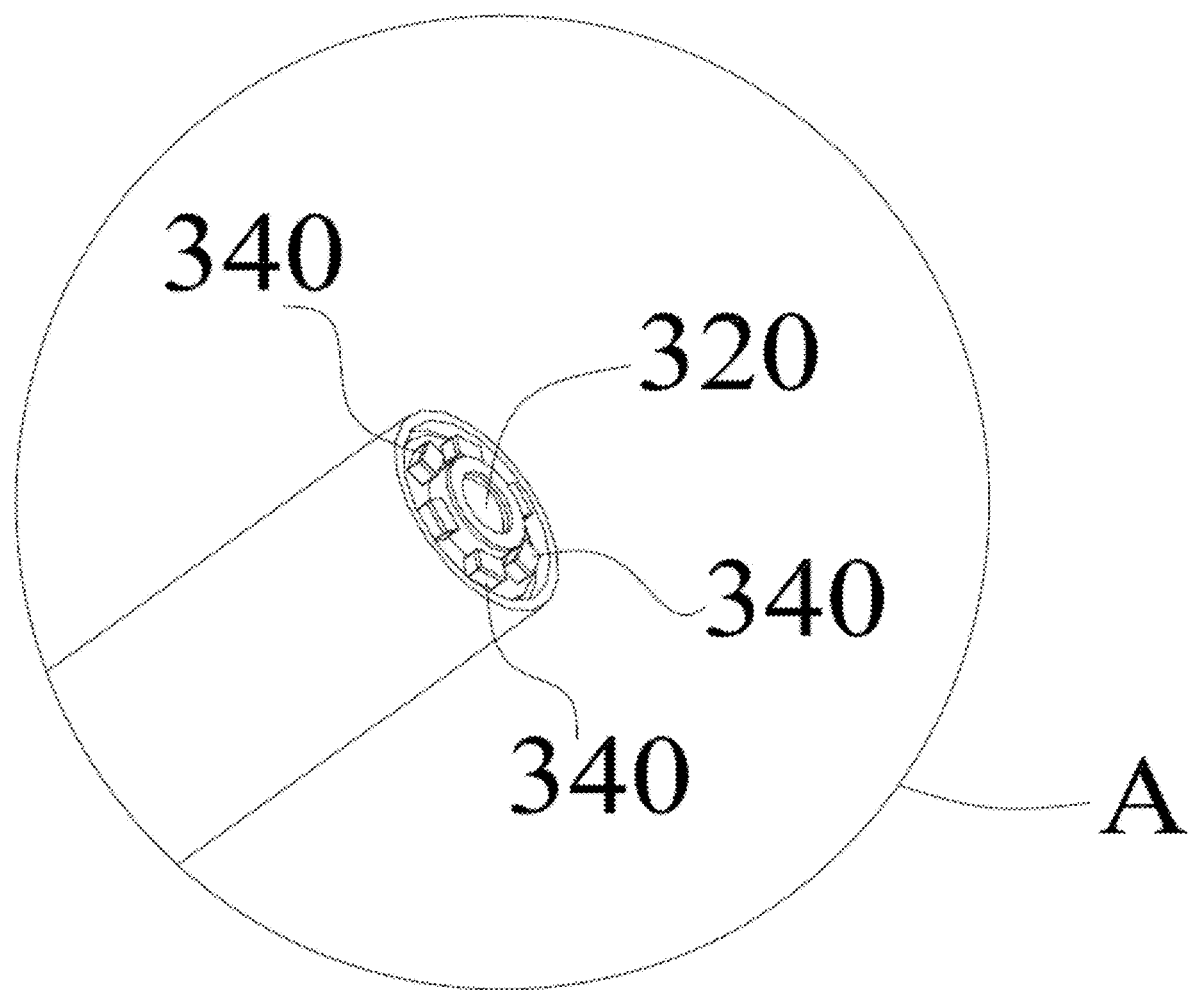
FIG. 2B is an enlarged view of area A in FIG. 2A.
Figure 3:
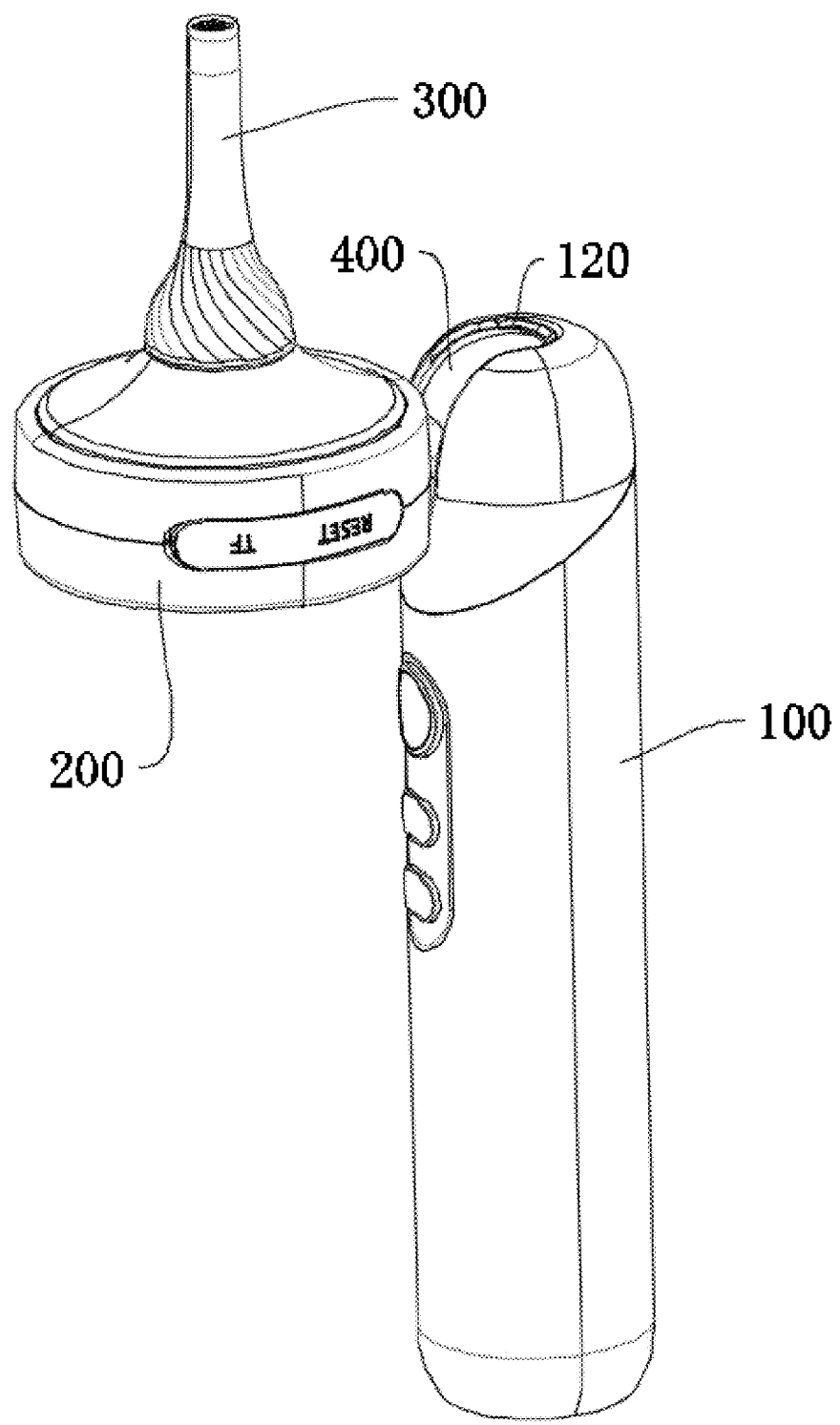
FIG. 3 is a schematic diagram of a structure of an inspection device, in which a display module is rotated to another angle.

This embodiment relates to an inspection device with a display screen. Referring to FIGS. 1, 2A and 2B, the inspection device includes: a handle 100, a display module 200 and an image acquisition module 300.

Referring to FIGS. 1, 2A, 2B, 3 and 4, a control circuit board 110 is provided in the handle 100. The display module 200 is assembled at one end of the handle 100, and a display screen 210 electrically connected to the control circuit board 110 is provided at one side of the display module 200. The image acquisition module 300 is arranged at one side of the display module 200 far away from the display screen 210, and is electrically connected to the control circuit board 110. The display module 200 is configured to display an image acquired by the image acquisition module 300.

Specifically, in this embodiment, the image acquisition module 300 sends acquired image information to the control circuit board 110, the control circuit board 110 performs image processing after receiving image information, and sends processed information to the display module 200, and finally the display screen 210 of the display module 200 displays a processed image.

The display module 200 with the display screen 210 is arranged at one end of the handle 100, and the image acquisition module 300 is arranged at the other side of the display screen 210, so that an operator can directly observe an image acquired by the image acquisition module 300 by the display screen 210 during operation. This operation is more convenient compared with the operation of observing an image from a mobile terminal. In addition, since the image acquisition module 300 is assembled at one side of the display module 200 far away from the display screen 210, that is, an acquisition end of the image acquisition module 300 is arranged parallel to the display screen 210, an image observed by an operator from the display screen 210 is similar to an angle at which the operator directly views the observed position, and the operator can control the inspection device to operate more conveniently.

Referring to FIGS. 1, 2A, 2B and 3, the display module 200 is rotatably assembled at one end of the handle 100. When the operator uses the inspection device, the display module 200 can be rotated relative to the handle 100 based on actual conditions, so that a use angle is adjusted to be optimal, which is convenient for operation and observation. In a specific embodiment, taking the inspection device standing on the ground as an example, the rotation of the display module 200 is vertical, and a rotation plane of the display module 200 is perpendicular to the display screen 210. In other embodiments, the display module 200 may also be rotated in other directions relative to handle 100.

Figure 5:
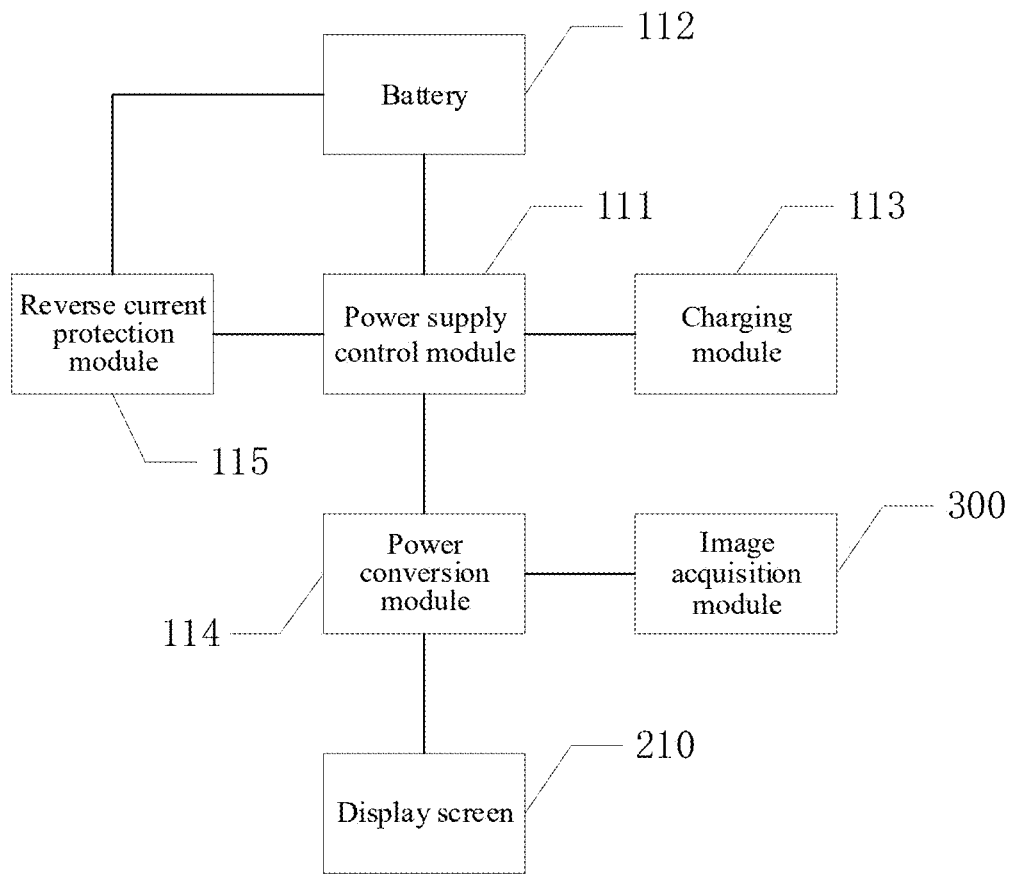
FIG. 5 is a connection model framework diagram of a control circuit board.
Figure 6A:
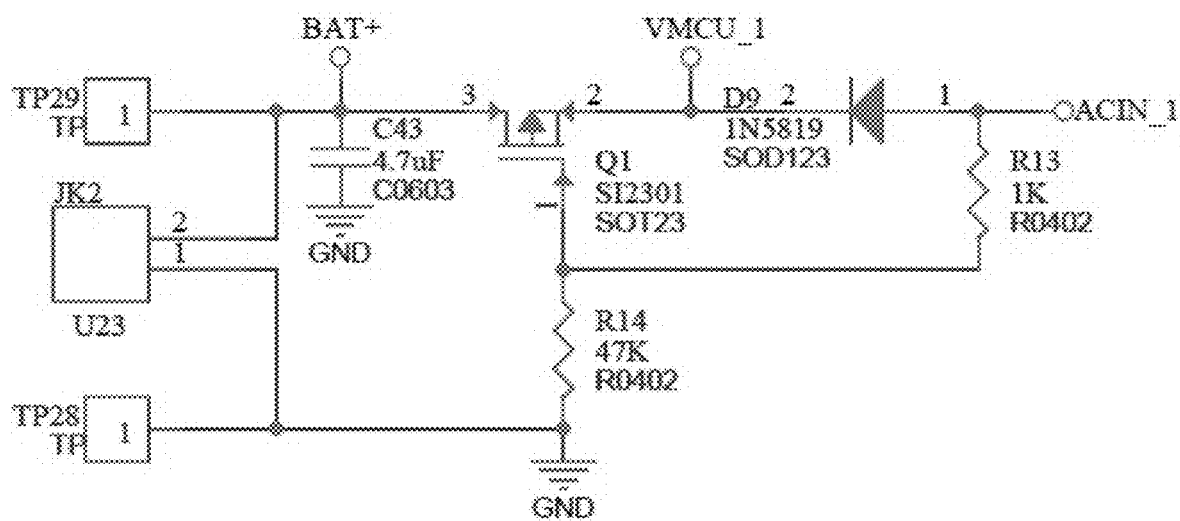
FIG. 6A is a schematic diagram of a first structure of a reverse current protection module.
Figure 6B:
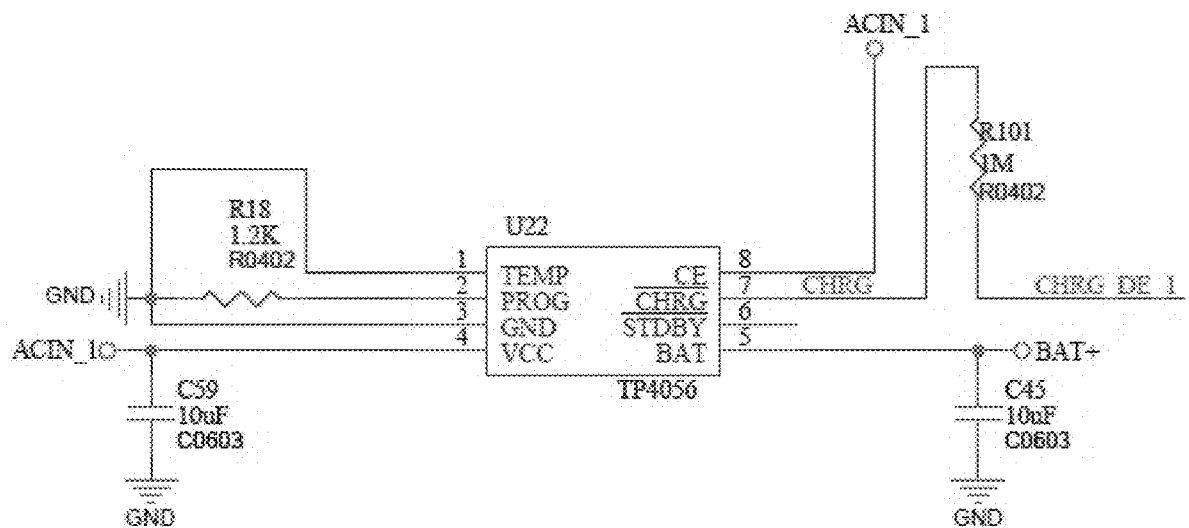
FIG. 6B is a schematic diagram of a second structure of a reverse current protection module.

A circuit structure of the control circuit board 110 in this solution is specifically provided with reference to FIGS. 5, 6A and 6B. In FIG. 5, a battery 112 (a structure and a shape are not limited and are not shown in a structure diagram) is also provided in the handle 100, the battery 112 is electrically connected to the control circuit board 110, and the battery 112 mainly provides power for the control circuit board 110. The control circuit board 110 includes: a power supply control module 111, a charging module 113, a power conversion module 114, and a reverse current protection module 115, wherein the power supply control module 111 is connected to the battery 112, the charging module 113, the power conversion module 114, and the reverse current protection module 115, and the power conversion module 114 is connected to the display screen 210 and the image acquisition module 300. When the charging module 113 is not connected to an external power source, the power supply control module 111 may supply power to the power conversion module 114 by the battery 112, and the power conversion module 114 provides driving power sources for the image acquisition module 300 and the display screen 210. This control logic is obvious to those skilled in the art and details are not described herein. When the charging module 113 is connected to an external power source, the power supply control module 111 may charge the battery 112 using the external power source by the charging module 113, and may also provide driving power sources for the image acquisition module 300 and the display screen 210 using the external power source by the charging module 113. This control logic is obvious to those skilled in the art and details are not described herein.

To prevent reverse current and protect a circuit from being damaged by reverse polarity, in FIGS. 6A and 6B, the reverse current protection module 115 includes: an MOS transistor Q1, a diode D9, a first resistor R14, a second resistor R13, and a battery charging management chip U22, wherein a source of the MOS transistor Q1 is connected to a positive electrode BAT+ of the battery 112, a drain of the MOS transistor Q1 is connected to a negative electrode of the diode D9 and the power supply control module 111 (i.e., VMCU_1), a gate of the MOS transistor Q1 is connected to one end of the first resistor R14 and one end of the second resistor R13, the other end of the second resistor R13 is connected to a positive electrode of the diode D9 and the battery charging management chip U22 (i.e., ACIN_1), and the other end of the first resistor R14 is grounded.

The working principle is as follows: when the battery charging management chip U22 outputs a low voltage to the ACIN_1 connection point, the MOS resistor Q1 is not turned on, a channel is not formed, and no current flows through the drain (Drain) and the source (Source). When the battery charging management chip U22 outputs a high voltage to the ACIN_1 connection point, the MOS transistor Q1 is turned on, a channel is formed, and a current flows through the drain (Drain) and the source (Source). A value of the voltage outputted by the battery charging management chip U22 to the ACIN_1 connection point is controlled to prevent reverse current, so that the protection circuit does not operate normally, and the display module 200 can stably display the image acquired by the image acquisition module 300.

Specifically, the battery charging management chip (U22) includes: a TP4056 charging management chip. TP4056 is a linear charging management chip designed specifically for a single-cell lithium-ion or lithium-polymer battery. A voltage positive input pin (VCC pin, a fourth pin) and an enabling input pin (CE pin, an eighth pin) of the TP4056 charging management chip are connected, and a connection point is ACIN_1. A battery connection pin (BAT pin, a fifth pin) of the TP4056 charging management chip is connected to a positive electrode of the battery (112).

Figure 7:
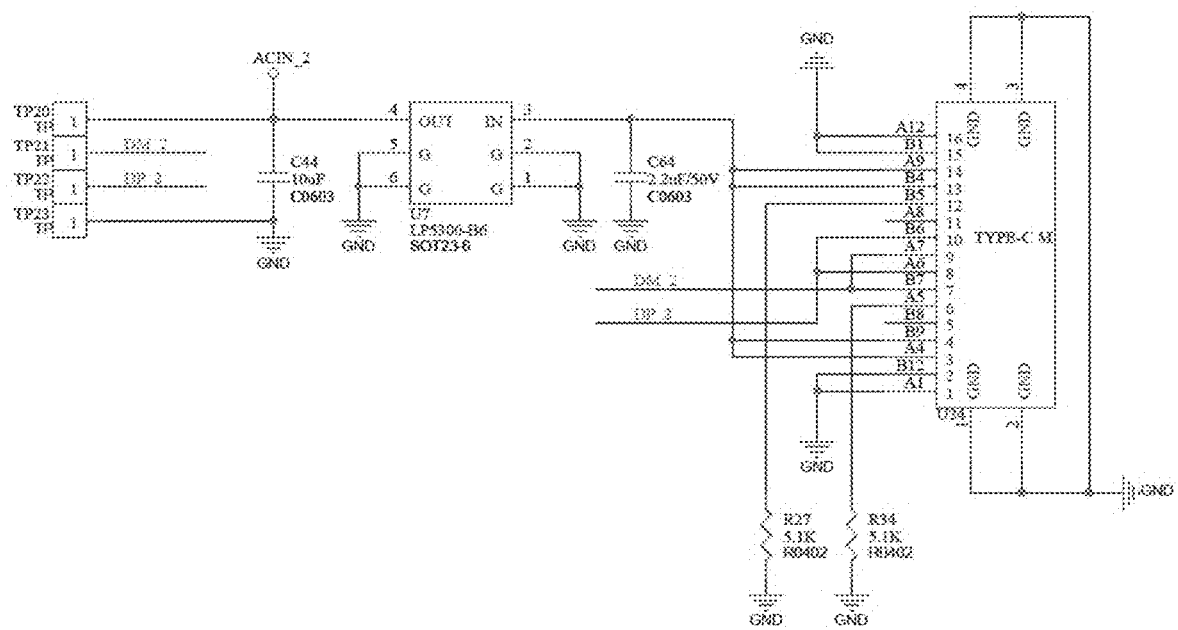
FIG. 7 is a schematic diagram of a structure of a charging module.

In one embodiment, referring to FIGS. 2A and 7, a charging through hole 140 is provided at one end of the handle 100 far away from the display module 200, and the charging module 113 includes: a Type-C female socket TYPE-C M and an overcurrent protection chip U7, an input pin (IN pin, a third pin) of the overcurrent protection chip U7 is connected to the Type-C female socket TYPE-C M, an output pin (OUT pin, a fourth pin) of the overcurrent protection chip U7 is connected to the power supply control module 111 (a connection point ACIN_2), and the Type-C female socket TYPE-C M is arranged in the charging through hole 140 and is configured for an external charging head to supply power to the device. Specifically, the connection point ACIN_2 may be connected to a charging switch, and then the charging switch is connected to the power supply control module 111. When the charging switch is pressed, the Type-C female socket Type-C M inputs external power supply and voltage into the power supply control module 111, and the power supply control module 111 internally controls to cut off the power supply of the battery 112, and converts into the external power supply and voltage to supply power to the entire circuit. Specifically, the overcurrent protection chip includes: an LP5300-B6 overcurrent protection chip. LP5300-B6 is an overvoltage and overcurrent protection integrated circuit chip produced by Lowpower Semiconductor Co., Ltd. When an input voltage or an input current exceeds a threshold, the internal MOSFET turns off to disconnect VIN and VOUT to protect the load. In addition, this chip also features an over-temperature protection (OTP) function that monitors a chip temperature to protect the device.

Figure 8:
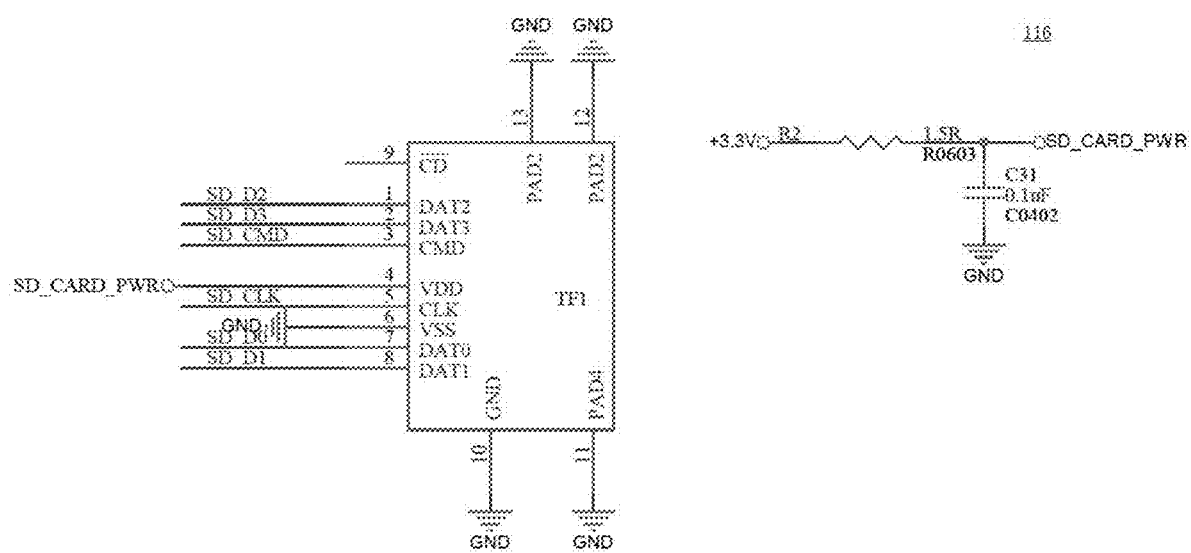
FIG. 8 is a schematic diagram of a structure of a TF card reading and writing module.

In one embodiment, referring to FIGS. 2A and 8, a TF card slot 230 is provided on one side of the display module 200. The control circuit board 110 further includes a TF card reading and writing module 116. The TF card reading and writing module 116 is connected to the power conversion module 114 and the power supply control module 111. The TF card reading and writing module 116 includes: a TF card socket TF1, a third resistor R2, and a filter capacitor C31. A working voltage pin (VDD pin, a fourth pin) of the TF card socket TF1 is connected to one end of the third resistor R2 and one end of the filter capacitor C31 (a connection point is SD_CARD_PWR), the other end of the filter capacitor C31 is grounded, the TF card socket TF1 is provided in the TF card slot 230, the other end of the third resistor R2 is connected to the power supply control module 111, and the power supply control module 111 provides a main control constant voltage of 3.3V.

Figure 9A:
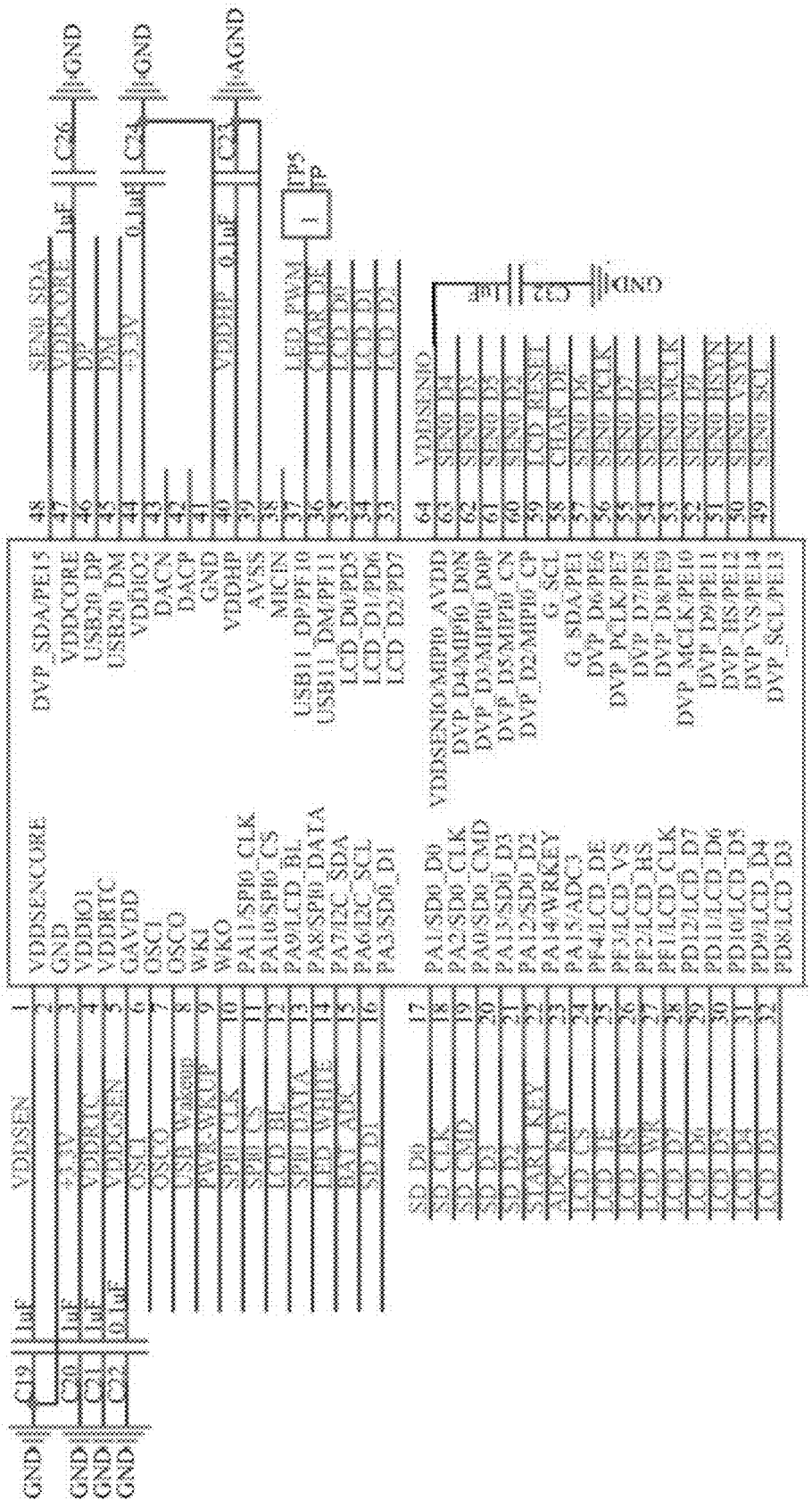
FIG. 9A is a schematic diagram of a structure of a power conversion module.
Figure 9B:
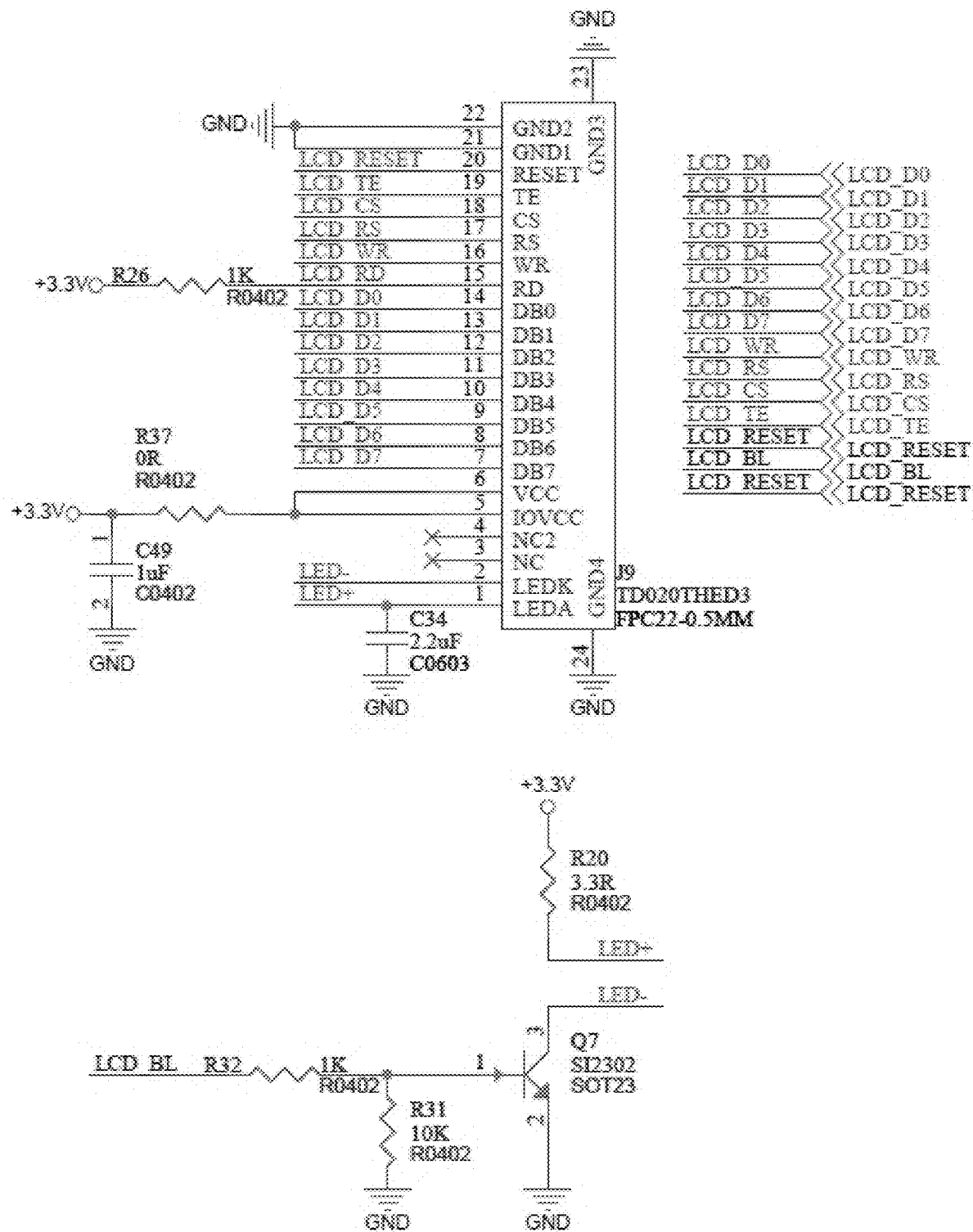
FIG. 9B is a schematic diagram of a structure of an FPC cable socket of a display screen.
Figure 10:
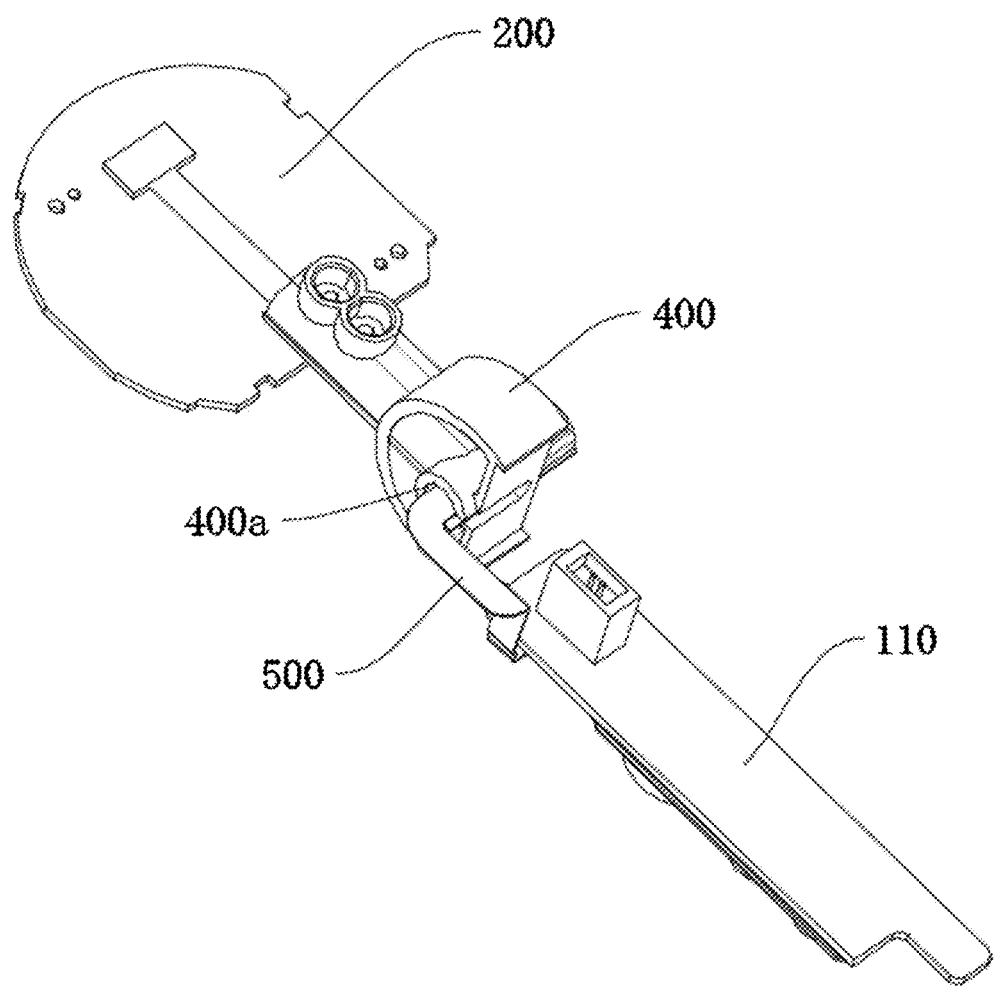
FIG. 10 is a schematic diagram of a structure of a flexible circuit board passing through a rotating seat.

In one embodiment, referring to FIGS. 9A and 9B, the power conversion module 114 includes: an HX3302C power conversion chip. HX3302C is a high-efficiency synchronous boost DC/DC converter chip with an output voltage adjustable between 2.5V and 5V to meet the voltage requirements of different applications. HX3302C is suitable for medium-power systems such as portable electronic devices, mobile power supplies, and power tools where medium-power power conversion is required. Pins 24-32 and 59 of the HX3302C power conversion chip in FIG. 9A are connected to LCD CS, LCD TE, LCD RS, LCD WR, LCD D7, LCD D6, LCD D5, LCD D4, LCD D3 and LCD RESET of the FPC cable socket of the display screen in FIG. 9B in sequence. Pins 35-33 of the HX3302C power conversion chip in FIG. 9A are connected to LCD D0, LCD D1 and LCD D2 of the FPC cable socket of the display screen in FIG. 9B in sequence.

The power conversion chip HX3302C is provided with a pin 15 BAT ADC connected to the battery 112, and the power conversion chip HX3302C is provided with a pin 3 VDDIO1 and a pin 44 VDDIO2 connected to the power control module 111, so that the power control module 111 provides a main control constant voltage of 3.3V.

The HX3302C power conversion chip is provided with pins 16-21, which are connected to pins SD_D1, SD_D0, SD_D0, SD_LCK, SD_CMD, SD_D3 and SD_D2 in the TF card reading and writing module 116.

The HX3302C power conversion chip is also provided with pins 63-60 and 57-49, which are connected to pins SEN0 D4, SEN0 D3, SEN0 D5, SEN0 D2, SEN0 D6, SEN0 PCLK, SEN0 D7, SEN0 D8, SEN0 MCLK, SEN0 D9, SEN0 HSYN, SEN0 VSYN and SEN0 SCL corresponding to the camera connection transmission in the image acquisition module 300.

In this embodiment, referring to FIGS. 3, 4, 10 and 11, a rotating seat 400 is rotatably assembled at one end of the handle 100, and the display module 200 is fixedly assembled on the rotating seat 400. The rotating seat 400 is arranged between the handle 100 and the display module 200 as a rotating connector, and a channel 400a which is communicated with the handle 100 and the display module 200 is arranged in the rotating seat 400, so that the flexible circuit board 500 can pass through the channel 400a to electrically connect the control circuit board 110 in the handle 100 and the circuit board of the display screen 210. The flexible circuit board 500 is hidden in the rotating seat 400, which is safe and aesthetic. Since the flexible circuit board 500 is flexible, the rotation of the rotating seat 400 does not affect the electrical connection between the control circuit board 110 and the circuit board of the display screen 210.

Referring to FIGS. 3 to 4 and 11 to 13, an arc-shaped travel hole 120 is formed at one end of the handle 100. The rotating seat 400 includes: a rotating seat body 410 rotatably assembled in the handle 100, and a fixing portion 420 arranged on the rotating seat body 410, extending out of the arc-shaped travel hole 120 and configured to fix and assemble with the display module 200.

Figure 4:
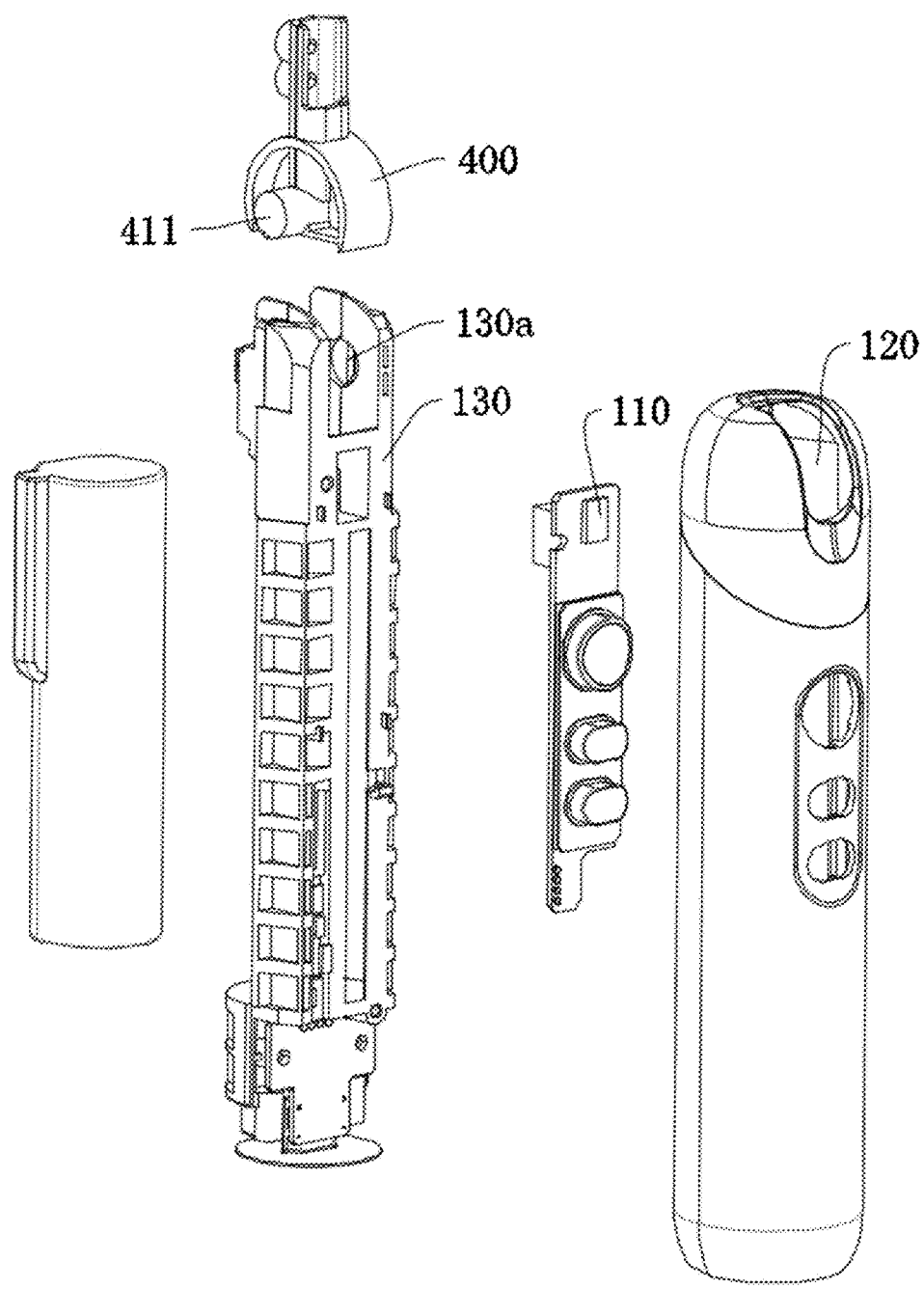
FIG. 4 is an exploded schematic diagram of structures of a handle and a rotating seat.
Figure 12:
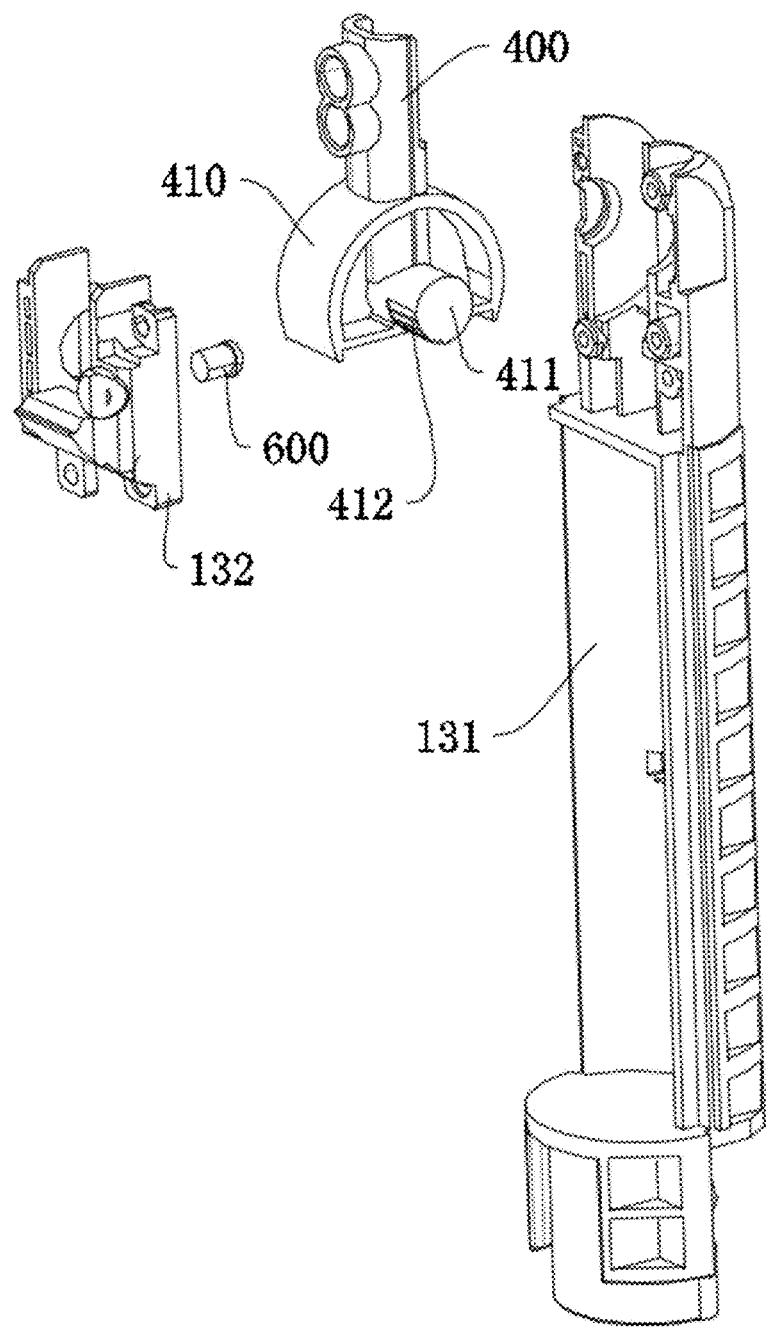
FIG. 12 is a schematic diagram of structures of a retainer, a rotating seat and an elastic protrusion.
Figure 13:
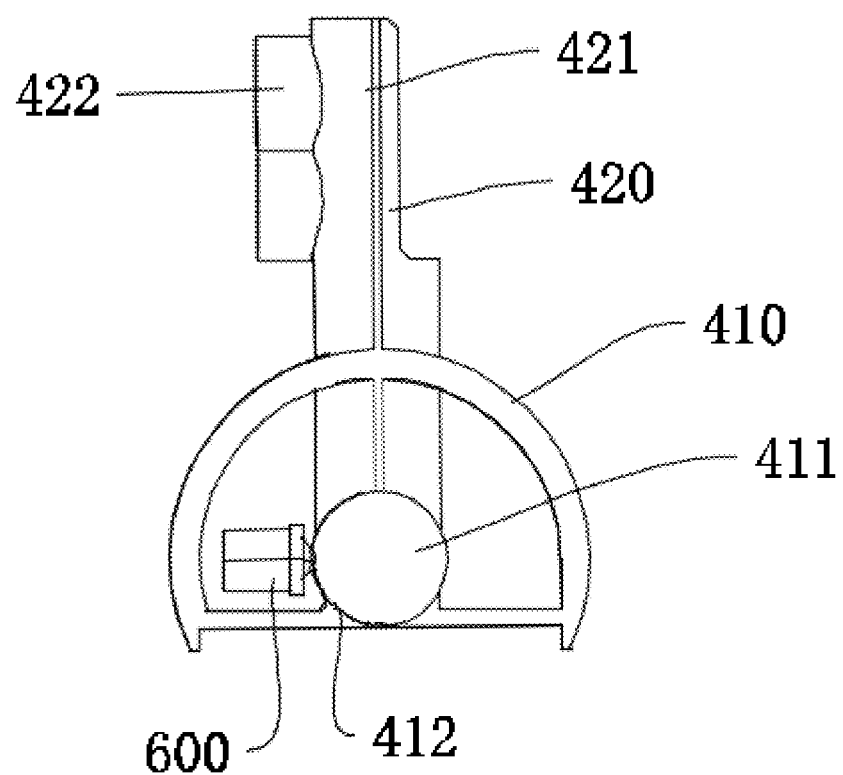
FIG. 13 is a schematic diagram of structures of a rotating seat and an elastic protrusion.

In this embodiment, referring to FIGS. 4 and 12, a retainer 130 is provided in the handle 100, and the rotating seat body 410 is rotatably assembled at one end of the retainer 130 close to the arc-shaped travel hole 120.

Figure 11:
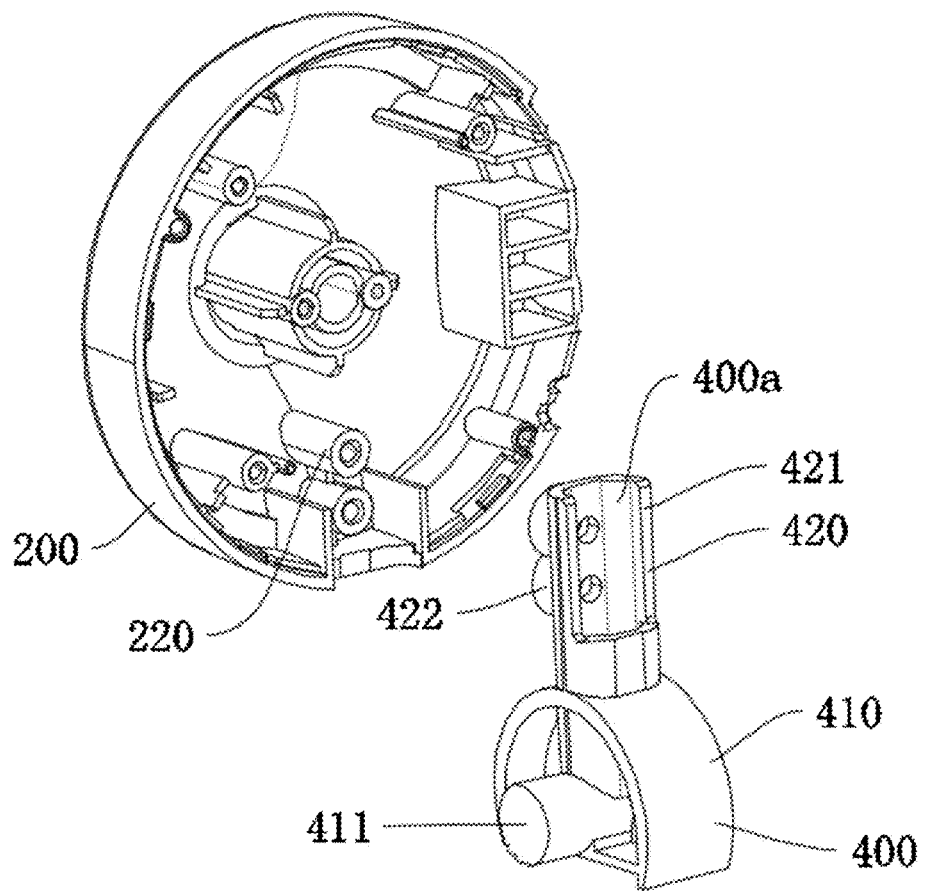
FIG. 11 is a schematic diagram of structures of a display module and a rotating seat.

In this embodiment, referring to FIG. 11, the fixing portion 420 of the rotating seat 400 includes a rod body 421 extending outward from the rotating seat body 410 and a sleeve body 422 arranged on one side of the rod body 421. The sleeve body 422 is sleeved on the screw mounting post 220 of the display module 200, and the sleeve body 422 is locked on the screw mounting post 220 by a screw, so that the fixed connection between the rotating seat 400 and the display module 200 is achieved. In other embodiments, the fixing portion 420 of the rotating seat 400 may be configured as other structures.

Referring to FIGS. 4 and 11 to 13, an outwardly protruding rotating shaft 411 is provided on the rotating seat body 410, one end of the retainer 130 close to the arc-shaped travel hole 120 is provided with a rotating shaft hole 130a corresponding to the rotating shaft 411. The rotating shaft 411 is rotatably assembled in the rotating shaft hole 130a, and the entire rotating seat 400 can rotate around the rotating shaft hole 130a. A rotation angle between the display module 200 and the handle (100) is M, where M is 0-360 degrees. To position the display module at a plurality of angles, for example, 30 degrees, 60 degrees, 90 degrees, 180 degrees, 240 degrees and 260 degrees, the retainer 130 is provided with an elastic protrusion 600 positioned in the rotating shaft hole 130a and protruding toward a center of the rotating shaft hole 130a, a plurality of arc-shaped grooves 412 corresponding to the elastic protrusion 600 are continuously provided on an outer peripheral wall of the rotating shaft 411. When the rotating seat body 410 rotates to a set angle, the elastic protrusion 600 is placed in one of the arc-shaped grooves 412, so that the angle positioning of the rotating seat body 410, namely the angle positioning of the display module 200, is achieved. When the angle of the display module 200 is changed, the display module 200 needs to be rotated with force; in this case, the elastic protrusion 600 is squeezed and in a compressed state. When the display module 200 is rotated to the set angle, the elastic protrusion 600 is aligned to another arc-shaped groove 412; in this case, the elastic protrusion 600 is no longer squeezed, and the elastic protrusion 600 extends outward under the action of the rebound force and presses against the arc-shaped groove 412, thereby achieving the angle positioning of the display module 200.

Referring to FIG. 12, the retainer 130 includes: a retainer body 131, and a retainer buckle cover 132 assembled on the retainer body 131 and configured to cooperate with the retainer body 131 to prevent the rotating seat body 410 from falling off. A space for the rotating seat body 410 to be rotated and assembled is reserved between the retainer body 131 and the retainer buckle cover 132, the retainer body 131 and the retainer buckle cover 132 jointly define the rotating shaft hole 130a, that is, the retainer body 131 and the retainer buckle cover 132 each have half of the rotating shaft hole 130a, and when the two are combined, a complete rotating shaft hole 130a is formed. In this embodiment, the elastic protrusion 600 is mounted in the retainer buckle cover 132. During assembly, the rotating seat 400 is firstly mounted on the retainer body 131, the elastic protrusion 600 is mounted in the retainer buckle cover 132, and then the retainer buckle cover 132 is covered. In this case, the rotating seat 400 is limited in the retainer 130, the rotating shaft 411 of the rotating seat 400 is positioned in the rotating shaft hole 130a, and the elastic protrusion 600 is aligned to the arc-shaped groove 412.

In other embodiments, other types of positioning structures may be arranged between the rotating seat 400 and the handle 100, so that the rotating seat 400 can be positioned at a set angle.

In this embodiment, referring to FIGS. 1, 2A and 2B, the image acquisition module 300 includes: a strip-shaped inspection head 310 assembled at one side of the display module 200 far away from the display screen 210, and a camera 320 arranged in the inspection head 310 and having a capturing end facing one side faraway from the display screen 210. The image acquisition module (300) shown in FIG. 2B further includes a plurality of LED lights 340 arranged around the camera 320, and the LED lights 340 are configured to provide illumination for the camera 320 when acquiring images, so that the images acquired by the inspection head 310 in a dark environment are still clear. One end of the inspection head 310 far away from the display screen 210 is configured to assemble a workpiece (not shown). The workpiece may be an earpick head, a pair of tweezers and the like. When the workpiece is the earpick head, the inspection device is the visual earpick, and when the workpiece is a pair of tweezers, the inspection device is the visual tweezers. In a preferred embodiment, the workpiece is detachably connected to one end of the inspection head 310 far away from the display screen 210, so that the user can replace different workpieces based on a requirement. The inspection head (310) shown in FIG. 2A is strip-shaped, and a protective cover (330) is also provided outside of the inspection head (310). The protective cover (330) is made of a flexible material, and the flexible materials such as rubber, silicone, and polyurethane elastomer have high elasticity and plasticity and can be stretched, compressed and twisted while maintaining original shape and performance.

In this embodiment, the display module 200 is in a shape of a round cake, a display window is provided on the display screen (210), and the display window is circular, so that the display screen 210 is circular. A TF card slot 230 is provided on the display module 200, and the handle 100 is in a shape of a round rod. The handle 100 is further provided with a battery, a charging port, a plurality of function buttons, and the like.

The principle of the present invention is substantially as follows: the display module 200 with the display screen 210 is arranged at one end of the handle 100, and the image acquisition module 300 is arranged at the other side of the display screen 210, so that an operator can directly observe the image acquired by the image acquisition module 300 by the display screen 210 during operation. This operation is more convenient compared with the operation of observing the image from a mobile terminal. In addition, since the image acquisition module 300 is assembled at one side of the display module 200 far away from the display screen 210, that is, an acquisition end of the image acquisition module 300 is arranged parallel to the display screen 210, an image observed by an operator from the display screen 210 is similar to an angle at which the operator directly views the observed position, and the operator can control the inspection device to operate more conveniently.

With the adoption of the above technical solution, the present invention has the following overall beneficial effects. In the present invention, the display module with the display screen is provided at one end of the handle, and the image acquisition module is arranged at the other side of the display screen, so that an operator can directly observe an image acquired by the image acquisition module by the display screen during operation. This operation is more convenient compared with the operation of observing an image from a mobile terminal. In addition, since the image acquisition module is assembled at one side of the display module far away from the display screen, that is, an acquisition end of the image acquisition module is arranged parallel to the display screen, an image observed by an operator from the display screen is similar to an angle at which the operator directly views the observed position, and the operator can control the inspection device to operate more conveniently. Moreover, a reverse current protection module is arranged on a control circuit board, which improves the display stability of the captured image and reduces the influence of circuit burnout on the display of the captured image.

The above description is only intended to illustrate the technical solution of the present invention and not to limit the present invention, and other modifications or equivalent substitutions made by those skilled in the art to the technical solution of the present invention should be covered by the scope of the claims of the present invention without departing from the spirit and scope of the technical solution of the present invention.

The invention claimed is:
1. An inspection device with a display screen, comprising:
a handle (100) internally provided with a control circuit board (110) and a battery (112);
a display module (200) assembled at one end of the handle (100), wherein a display screen (210) electrically connected to the control circuit board (110) is arranged on one side of the display module (200); and
an image acquisition module (300) assembled at one side of the display module (200) far away from the display screen (210) and electrically connected to the control circuit board (110); wherein the display module (200) is configured to display an image acquired by the image acquisition module (300);
the control circuit board (110) comprises: a power supply control module (111), a charging module (113), a power conversion module (114), and a reverse current protection module (115), wherein the power supply control module (111) is connected to the battery (112), the charging module (113), the power conversion module (114), and the reverse current protection module (115), and the power conversion module (114) is connected to the display screen (210) and the image acquisition module (300); and
the reverse current protection module (115) comprises: an MOS transistor (Q1), a diode (D9), a first resistor (R14), a second resistor (R13), and a battery charging management chip (U22), wherein a source of the MOS transistor (Q1) is connected to the battery (112), a drain of the MOS transistor (Q1) is connected to a negative electrode of the diode (D9) and the power supply control module (111), a gate of the MOS transistor (Q1) is connected to one end of the first resistor (R14) and one end of the second resistor (R13), the other end of the second resistor (R13) is connected to a positive electrode of the diode (D9) and the battery charging management chip (U22), and the other end of the first resistor (R14) is grounded.

2. The inspection device with the display screen according to claim 1, wherein the battery charging management chip (U22) comprises: a TP4056 charging management chip, a voltage positive input pin and an enabling input pin of the TP4056 charging management chip are connected, and a battery connection pin of the TP4056 charging management chip is connected to a positive electrode of the battery (112).

3. The inspection device with the display screen according to claim 1, wherein a charging through hole (140) is provided at the other end of the handle (100), the charging module (113) comprises:
a Type-C female socket (TYPE-C M) and an overcurrent protection chip (U7), an input pin of the overcurrent protection chip (U7) is connected to the Type-C female socket (TYPE-C M), an output pin of the overcurrent protection chip (U7) is connected to the power supply control module (111), and the Type-C female socket (TYPE-C M) is arranged in the charging through hole (140).

4. The inspection device with the display screen according to claim 3, wherein the overcurrent protection chip comprises: an LP5300-B6 overcurrent protection chip.

5. The inspection device with the display screen according to claim 1, wherein the control circuit board (110) further comprises: a TF card reading and writing module (116), and the TF card reading and writing module (116) is connected to the power conversion module (114) and the power supply control module (111).

6. The inspection device with the display screen according to claim 5, wherein a TF card slot (230) is provided on the display module (200), the TF card reading and writing module (116) comprises:
a TF card socket (TF1), a third resistor (R2), and a filter capacitor (C31), a working voltage pin of the TF card socket (TF1) is connected to one end of the third resistor (R2) and one end of the filter capacitor (C31), the other end of the filter capacitor (C31) is grounded, the other end of the third resistor (R2) is connected to the power supply control module (111), and the TF card socket (TF1) is arranged in the TF card slot (230).

7. The inspection device with the display screen according to claim 1, wherein the power conversion module (114) comprises: an HX3302C power conversion chip.

8. The inspection device with the display screen according to claim 1, wherein a rotating seat (400) is rotatably assembled at one end of the handle (100), the display module (200) is fixedly assembled on the rotating seat (400), an arc-shaped travel hole (120) is formed at one end of the handle (100), and the rotating seat (400) comprises: a rotating seat body (410) rotatably assembled in the handle (100), and a fixing portion (420) arranged on the rotating seat body (410), extending out of the arc-shaped travel hole (120) and configured to fix and assemble with the display module (200); and the rotating seat (400) moves in the arc-shaped travel hole (120) to enable the display module (200) and the handle (100) to rotate relatively.

9. The inspection device with the display screen according to claim 1, wherein a retainer (130) is provided in the handle (100), an outwardly protruding rotating shaft (411) is provided on the rotating seat body (410), one end of the retainer (130) close to the arc-shaped travel hole (120) is provided with a rotating shaft hole (130a) corresponding to the rotating shaft (411), and the rotating seat body (410) is rotatably assembled at one end of the retainer (130) close to the arc-shaped travel hole (120) by the rotating shaft (411).

10. The inspection device with the display screen according to claim 9, wherein a positioning structure is provided between the rotating seat (400) and the handle (100), so that the rotating seat (400) can be positioned at a set angle.

11. The inspection device with the display screen according to claim 10, wherein the retainer (130) is provided with an elastic protrusion (600) positioned in the rotating shaft hole (130a) and protruding toward a center of the rotating shaft hole (130a), a plurality of arc-shaped grooves (412) corresponding to the elastic protrusion (600) are continuously provided on an outer peripheral wall of the rotating shaft (411), and when the rotating seat body (410) rotates to a set angle, the elastic protrusion (600) is placed in one of the arc-shaped grooves (412).

12. The inspection device with the display screen according to claim 11, wherein the retainer (130) comprises: a retainer body (131), and a retainer buckle cover (132) assembled on the retainer body (131) and configured to cooperate with the retainer body (131) to prevent the rotating seat body (410) from falling off, a space for the rotating seat body (410) to be rotated and assembled is reserved between the retainer body (131) and the retainer buckle cover (132), the retainer body (131) and the retainer buckle cover (132) jointly define the rotating shaft hole (130a), and the elastic protrusion (600) is mounted in the retainer buckle cover (132).

13. The inspection device with the display screen according to claim 12, wherein the fixing portion (420) comprises a rod body (421) extending outward from the rotating seat body (410) and a sleeve body (422) arranged on one side of the rod body (421), the display module (200) is provided with a screw mounting post (220), and the sleeve body (422) is sleeved on the screw mounting post (220) and locked by screws.

14. The inspection device with the display screen according to claim 10, wherein the display module (200) is rotatable relative to the handle (100).

15. The inspection device with the display screen according to claim 9, wherein a channel (400a) communicates with the handle (100) and the display module (200) and allowing a flexible circuit board (500) to pass through, the channel is formed in the rotating seat (400).

16. The inspection device with the display screen according to claim 1, wherein a display window is provided on the display screen (210), the display window is circular, the image acquisition module (300) comprises a camera (320), and the display screen (210) is arranged parallel to the camera (320).

17. The inspection device with the display screen according to claim 16, wherein the image acquisition module (300) further comprises an inspection head (310) assembled at one side of the display module (200) far away from the display screen (210), the camera (320) is arranged in the inspection head (310), and one end of the inspection head (310) far away from the display screen (210) is configured to assemble a workpiece.

18. The inspection device with the display screen according to claim 17, wherein the inspection head (310) is strip-shaped.

19. The inspection device with the display screen according to claim 18, wherein a protective cover (330) is also provided outside of the inspection head (310), and the protective cover (330) is made of a flexible material.

20. The inspection device with the display screen according to claim 19, wherein the image acquisition module (300) further comprises a plurality of LED lights (340) arranged around the camera (320).

* * * * *